March 10, 1953 — A. YATES — 2,631,019
AIR WASHER AND COOLER
Filed Oct. 18, 1949
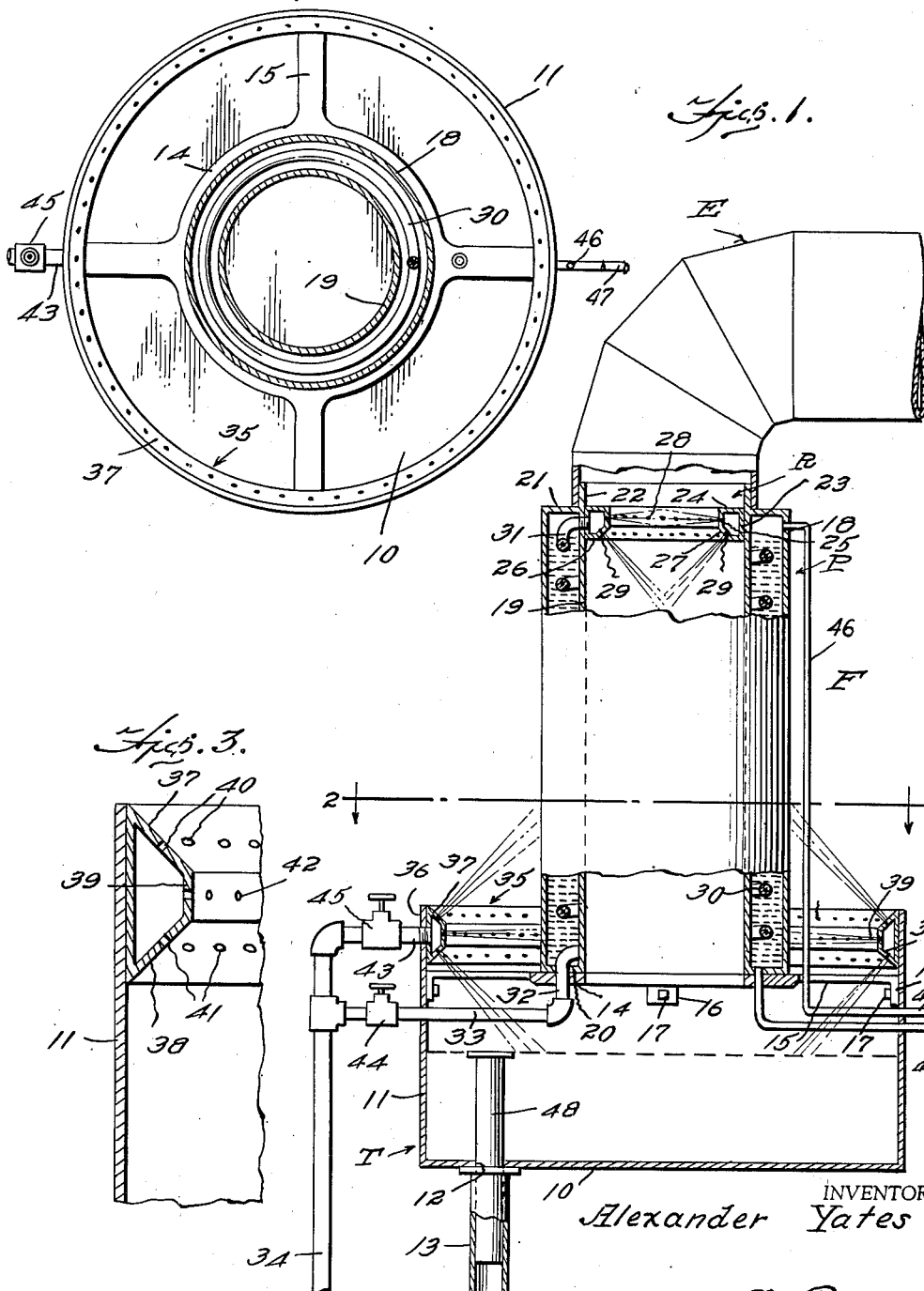
INVENTOR
Alexander Yates
BY Wilfred Lawson
ATTORNEY Patented Mar. 10, 1953

2,631,019

UNITED STATES PATENT OFFICE 2,631,019

AIR WASHER AND COOLER

Alexander Yates, Hollandale, Miss.

Application October 18, 1949, Serial No. 121,932

1 Claim. (Cl. 261—11)

This invention appertains to an improvement in air washers, and has for its primary object to provide a type of the same for effectively cooling a volume of air, as well as washing it, for general usage and more particularly for use in connection with diesel engines or the like.

Another object of the invention resides in the provision of an air washer, wherein an air stream is passed through two widely spaced water sprays and an intervening cooling area, the direction of the air flow through the first of the water sprays being reversed in its passage to and through the cooling area and the second of the water sprays.

A further object of the invention is to provide an air washer as above characterized, wherein an open top tank is provided with a vertical flue supported within and concentrically of its open top, an annular spray head being supported within the space between the top edge portion of the side wall of the tank and the lower end of the flue, and a second annular spray head supported within the top end of the flue; the flue being double walled between its ends to provide a closed chamber to receive a cooling medium, such as a brine solution or the like.

Still another object of the invention is to provide an air washer of the kind mentioned, wherein the aforesaid spray heads are separately supplied with water under pressure, with the water for the said second spray head being passed to the same through a coil housed within the hollow interior of the flue for contact with the cooling medium supplied to the latter, and the tank is provided with a vertically adjustable overflow in its bottom so that a body of water is retained within the tank and its level varied with respect to the lower end of the flue to increase or decrease the air passage area between the water level and the lower end of the flue.

The invention consists in the details of construction and in the combination and arrangement of the several parts of my improved air washer for diesel engines whereby certain advantages are attained, as will be hereinafter more fully set forth.

In order that my invention may be better understood, I will now proceed to describe the same with reference to the accompanying drawings, wherein:

Figure 1 is a side view of an air washer in accordance with the present invention partly shown in section and partly in elevation.

Figure 2 is a view in section taken on the line 2—2 of Figure 1.

Figure 3 is a fractional detail view in section of the spray ring arranged in the upper end portion of the water tank shown in a larger scale.

The air washer herein embodied comprises a water tank T having a bottom wall 10 and a peripheral wall 11. The bottom 10 is provided with a hole 12 and a drain pipe 13 is secured to the under surface of the bottom 10 in any suitable manner so that it is disposed coaxially with the hole 12.

An annular support 14 has a plurality of radially outwardly extending bracket arms 15, the outer end portions 16 of which are secured to the peripheral wall 11 of the tank T by means of bolts 17 or in any other suitable manner.

An air flue F has a hollow peripheral wall P comprising an outer wall 18, an inner wall 19 spaced from the outer wall and disposed coaxial therewith, a bottom wall 20 extending between the outer and the inner wall 18 and 19 respectively and closing the hollow peripheral wall P at its bottom, and a top wall 21 extending between the outer and inner wall 18 and 19 respectively and closing the hollow peripheral wall P at its top.

The air flue F is mounted on the annular support 14 so that the bottom wall 20 of the hollow peripheral wall P of the flue F rests on said support.

A spray ring R comprises an outside wall 23 fitting snugly into the inner wall 19, and an upper wall 24 extending inwardly from the outside wall 23 at a right angle thereto. The spray ring R has further an inside wall 25 extending downwardly from the upper wall 24 and at right angles thereto. The inside wall 25 is shorter than the outside wall 23 and a lower wall 26 extends inwardly from said wall 23 at right angles thereto and is approximately of the same width as the inside wall 25. The inner edge of the lower wall 26 and the lower edge of the inside wall 25 are connected with each other by a slanting wall 27. The inside wall 25 and the slanting wall 27 are each provided with a plurality of fine spray holes 28 and 29 respectively.

A coiled pipe 30 is located inside the hollow peripheral wall P of the air flue F and the upper end portion 31 of said coiled pipe 30 is bent to extend radially inwardly of said pipe and extends through the inner wall 19. The spray ring R is arranged so in the flue F that the upper wall 24 of said ring is disposed approximately at the same level as the top wall 21 of the hollow peripheral wall P. The upper end portion 31 of the coiled pipe 31 extends also through the outside wall 23 of the spray ring R. The lower end portion 32 of the coiled pipe 30 extends straight downwardly through the bottom wall 20 of the flue wall P and through the support 14 and is connected by a feed pipe 33 with another pipe 34 conducting water from a source of water under pressure (not shown).

Another spray ring 35 comprises an outer peripheral wall 36 fitting snugly into the tank T. An upper wall 37 slants inwardly and downwardly from the upper edge of said outer peripheral wall 37 and a lower wall 38 extends inwardly and upwardly from the lower edge of said outer peripheral wall. An inner wall 39 connects the inner edges of the upper and lower walls 37 and 38. The upper wall 37, the lower wall 38 and the inner wall 39 are each provided with a plurality of fine spray holes 40, 41 and 42 respectively.

The spray ring 35 is arranged inside the tank T and adjacent to the upper edge of the peripheral wall 11 above the support 14. A pipe 43 extending through the peripheral tank wall 11 and the outer spray ring wall 36 connects said spray ring 35 with the pipe 34.

Each of the connecting pipes 33 and 43 is provided with a valve 44 and 45 respectively.

A pipe line 46 extends laterally into the tank T and thence upwardly through the support 14 to a point adjacent the top end of the flue F, where it enters the outer side wall 18 to discharge a fluid cooling medium, such as a brine solution or the like, from a source (not shown), while a return pipe line 47 leads from the bottom of the flue and laterally outward through the side wall of the tank to the said source.

An overflow pipe 48 is slidably supported in the bottom 10, of the tank T, with its lower end likewise engaged with the upper open end of a drain pipe 13, so as to allow for its vertical adjustment to vary the level of water to be retained within the tank and thus correspondingly vary the air passage area between the lower end of the flue F and the water level.

In use the two valves 44 and 45 are opened and water under pressure is sprayed through the holes 40 and 42 towards the outer wall 18 of the hollow peripheral wall P and through the holes 41 through the space between the peripheral wall 19 of the tank T and the support 14 into the tank cooling and washing the air traveling through the air flue F. Water under pressure flows also through the coiled pipe 30 and is sprayed through the holes 28 and 29 in the upper spray ring R and washes the air rising in the air flue F and entering the elbow E.

The water in the coiled pipe 30 is cooled by the brine being fed into the hollow peripheral wall P by the pipe 46 and drained therefrom through the pipe 47.

The water sprayed through the two spray rings R and 35 is collected in the tank T and the water level can be raised or lowered selectively by adjusting the overflow pipe 48 in the drain pipe 13 whereby the air area underneath the air flue F is decreased or increased.

I claim:

In an air washer, a tank having an open top, an air conducting tube rising from a point within the open top of the tank and centered with respect thereto, the lower end of the tube being disposed above the level of a body of water retained within the tank for the passage of an air flow upwardly thereof incoming through the open portion of the tank surrounding the tube, an annular spray head supported within the said open portion of the tank and between the side wall of the tank and the opposed side of the tube, said tube having a chamber encircling the same, a water coil within said chamber, an annular spray head supported within the top end of the tube and connected with the upper end of said coil, valve controlled means for supplying water to the first spray head and to the lower end of said coil, other means for supplying water to said chamber for circulation therein about the coil, and an adjustable overflow pipe depending through the bottom of the tank to vary the level of the water to be retained within the tank and thereby correspondingly vary the area of the air passage between the water level and the lower end of the tube.

ALEXANDER YATES.

REFERENCES CITED

The following references are of record in the file of this patent:

UNITED STATES PATENTS

| Number | Name | Date |
|---|---|---|
| 228,765 | Kennedy | June 15, 1880 |
| 893,452 | Culver | July 14, 1908 |
| 917,561 | Double | Apr. 6, 1909 |
| 926,198 | Koerting | June 29, 1909 |
| 1,102,996 | Bottenstein | July 7, 1914 |
| 1,734,677 | Kreisinger | Nov. 5, 1929 |
| 1,756,673 | Baumann | Apr. 29, 1930 |
| 1,877,296 | Goldberg | Sept. 13, 1932 |
| 2,348,791 | Di Pietro | May 16, 1944 |